No. 611,812. Patented Oct. 4, 1898.
A. LARSSON.
ARTIFICIAL LEG.
(Application filed Apr. 4, 1898.)

(No Model.)

Witnesses:

Inventor:
August Larsson

By his Attorneys.

UNITED STATES PATENT OFFICE.

AUGUST LARSSON, OF HERRLJUNGA, SWEDEN.

ARTIFICIAL LEG.

SPECIFICATION forming part of Letters Patent No. 611,812, dated October 4, 1898.

Application filed April 4, 1898. Serial No. 676,400. (No model.)

*To all whom it may concern:*

Be it known that I, AUGUST LARSSON, of Herrljunga, in the county of Westergötland, Kingdom of Sweden, have invented certain new and useful Improvements in Artificial Legs, of which the following is a full, clear, and exact specification.

My invention consists in the special means for adjusting the length of the artificial leg.

Figure 1:
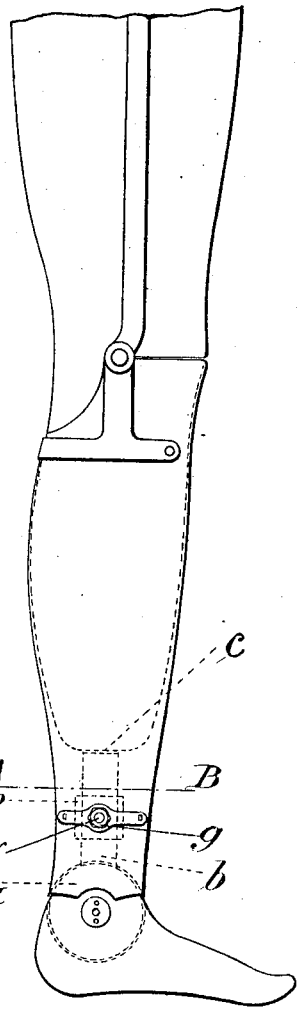
Figure 2:
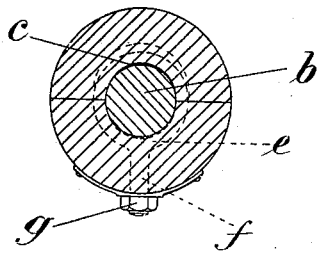
Figure 2:
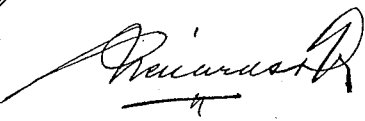

In the annexed drawings an artificial leg provided with the arrangement in question is shown in Figure 1 in a side view, and in Fig. 2 in a transverse section, on an enlarged scale, along the line A B of Fig. 1.

The arrangement consists in making one part of the ankle-joint not rigidly united to the foreleg, as usual, but in a separate piece $a$, which is provided with a cylindrical pin $b$, that can be pushed more or less into a corresponding axial hole $c$ in the lower end of the foreleg. The said hole is surrounded at a portion of its length by a sleeve $e$, which is movable perpendicularly to it and the aperture of which is just large enough to allow of the pin $b$ being inserted into it. The sleeve is provided with a threaded bolt $f$, which projects through a plate at the outer side of the leg and is kept in place by means of a nut $g$, bearing on the plate.

In attaching the ankle-joint to the foreleg the sleeve is first adjusted so as to bring its aperture in line with the hole in the leg, and the pin $b$ is subsequently inserted into the hole and sleeve sufficiently to give the proper length to the leg. By screwing up the nut the pin is drawn against the wall of the hole, and it is held firmly in this position by the friction of the latter. When at any time it is desired to readjust the leg, this is accomplished by simply loosening the nut, thus releasing the pin $b$, which can now be readily adjusted into the new position, where it is held by screwing up the nut anew. By making the pin $b$ cylindrical the advantage is evidently gained that the artificial leg also can be given the proper adjustment horizontally.

Having now particularly described and ascertained the nature of my said invention and in what manner the same is to be performed, I declare that what I claim is—

1. The combination in an artificial leg, of the foreleg-section having a hole extending axially upward into its lower end, with the ankle-joint piece $a$, having a cylindrical pin extending up into the said hole of the foreleg, a sleeve in said hole embracing the said pin and clamping means for forcing the sleeve laterally to clamp the parts, substantially as described.

2. In combination, the foreleg having an axial hole in its lower end, the ankle-joint piece having a pin extending up into the hole and the sleeve in the said hole movable laterally therein and having a bolt $f$ extending out through the side of the foreleg and the clamping-nut to draw the parts into clamped condition, substantially as described.

In witness whereof I have hereunto set my hand in presence of two witnesses.

AUGUST LARSSON.

Witnesses:
M. ÅBERG,
G. LUNSSON.